United States Patent [19]
Minor et al.

[11] Patent Number: 5,191,943
[45] Date of Patent: Mar. 9, 1993

[54] THREE-POINT HITCH ATTACHED GRADER WITH ADJUSTABLE BLADES

[76] Inventors: Michael K. Minor, 7411 Kinston Cove, Southhaven, Miss. 38671; Bernie B. Bierman, 8569 Kings Cross Cove, Cordova, Tenn. 38018

[21] Appl. No.: 748,524

[22] Filed: Aug. 22, 1991

[51] Int. Cl.⁵ .................. A01B 35/20; F16B 1/00
[52] U.S. Cl. .................. 172/393; 172/445.1; 172/684.5; 172/744; 403/DIG. 8
[58] Field of Search .................. 172/445.1, 252, 254, 172/392, 393, 734, 737, 738, 744, 684.5; 37/266, 268, 108 R, 108 A, DIG. 13; 403/DIG. 8, 4; 404/118

[56] References Cited

U.S. PATENT DOCUMENTS

| | | | |
|---|---|---|---|
| 1,068,155 | 7/1913 | Mosher | 172/393 |
| 4,196,778 | 4/1980 | Smith | 172/445.1 |
| 4,320,988 | 3/1992 | Seal | 172/393 |
| 4,346,528 | 8/1982 | Shwayder | 37/270 |
| 4,572,301 | 2/1986 | Bourgeois, Jr. | 172/445.1 |
| 4,630,686 | 12/1986 | Ausmus, Jr. | 172/684.5 |
| 4,655,297 | 4/1987 | Bourgeois, Jr. | 172/445.1 |
| 4,850,433 | 7/1989 | West | 172/684.5 |
| 4,924,945 | 5/1990 | Mork | 172/445.1 |
| 4,997,303 | 3/1991 | Xu et al. | 403/4 |

Primary Examiner—Randolph A. Reese
Assistant Examiner—Spencer Warnick
Attorney, Agent, or Firm—Jacobson, Price, Holman & Stern

[57] ABSTRACT

A grader especially adapted for use in association with a tractor having a three-point hitch with the grader being capable of use in cutting, moving, spreading and leveling all types of soil, aggregate and the like. The grader can also be used to carry, spread and level hot and cold asphalt, soil, aggregate and the like. The grader has blades adjustable to a predetermined depth with the specific angle of the grader blades and the speed of movement in relation to the surface being worked determining the operational characteristics of the grader. The grader includes a pair of transversely extending blades oriented at a particular angle and being vertically adjustably attached to a pair of side frame members having ground engaging slide shoes along the lower surface thereof. The ends of the blades are vertically adjustably connected to the side frame members and provided with manually operated cam structures to adjust the blades vertically. The blades are mounted on an angled support bar in vertically adjusted positions to enable the position of the blades to be adjusted to compensate for wear.

16 Claims, 2 Drawing Sheets

THREE-POINT HITCH ATTACHED GRADER WITH ADJUSTABLE BLADES

BACKGROUND OF THE INVENTION

1. Field of the Invention

The present invention generally relates to an earth working implement and more particularly to a grader especially adapted for use in association with a tractor having a three-point hitch with the grader being capable of use in cutting, moving, spreading and leveling all types of soil, aggregate and the like. The grader can also be used to carry, spread and level hot and cold asphalt, soil, aggregate and the like. The grader has blades adjustable to a predetermined depth with the specific angle of the grader blades and the speed of movement in relation to the surface being worked determining the operational characteristics of the grader. The grader includes a pair of transversely extending blades oriented at a particular angle and being vertically adjustably attached to a pair of side frame members having ground engaging slide shoes along the lower surface thereof. The ends of the blades are vertically adjustably connected to the side frame members and provided with manually operated cam structures to adjust the blades vertically. The blades are mounted on an angled support bar in vertically adjusted positions to enable the position of the blades to be adjusted to compensate for wear.

2. Description of the Prior Art

Prior U.S. Pat. No. 4,320,988 issued Mar. 23, 1982 discloses a structure in the form of a grader/spreader which includes blades which can function as grader blades or as a spreader. The prior art cited in the above patent and made of record herein is also relevant to this invention. However, the prior art does not disclose a grader with a rigid blade arrangement which can be adjusted to compensate for wear and to orient the edge of the blade in a predetermined relation to the slide shoes on a pair of side frame members with the blade being supported by a mounting structure in a manner to enable the blade to be adjusted in relation to the mounting structure to compensate for wear and to provide a blade which can be oriented in numerous increments of adjustment to compensate for blade wear to maintain a substantially constant depth relationship between the bottom edge of the grader blades and the bottom surface of slide shoes on the side frame members of the grader. Further, the prior art does not disclose grader blades rigidly associated with side frame members in which the blades are oriented at a 17° angle in relation to vertical to enable the grader blades to be used as a grader with the angle of the blade providing optimum cut into the surface bed while creating a "boiling" effect on the material with the material moving in a rotatable motion due to the angle of the blades with this movement providing optimum mix and distribution of the material back to the surface bed with the fine material being released first to form a base and the larger material then being released to form the top layer on the surface bed thereby providing an ideal mix for compaction. The blades are also used to move material by slowing the tractor or other towing vehicle with the angle of the blades enabling the material to be pulled and distributed. The "boiling" effect causes the material to mix as indicated previously but instead of releasing the material, it rolls in front of the blades until released by the operator by lifting the grader by using the three-point hitch in a conventional manner.

SUMMARY OF THE INVENTION

An object of the present invention is to provide a grader which includes a rigid framework supported from a vehicle such as the three-point hitch of a tractor by which the grader may be moved along a surface bed and elevated by the tractor operator when desired with the grader including side frame members and a pair of blades rigidly extending between the side frame members and being vertically adjustably positioned in relation to slide shoes on the bottom surface of the side frame members to maintain a constant and desired vertical relationship to the slide shoes to enable a desired and optimum cut of the surface bed to be made during movement of the grader along the surface bed.

Another object of the invention is to provide a grader in accordance with the preceding object in which the grader blades are oriented at an angle of 17° to enable the grader blade to serve to cut and distribute the material back onto the surface bed when moved over the surface at a predetermined speed and to serve as a device for moving material when the grader is moved over the surface bed at a slower speed.

A further object of the invention is to provide a grader attached to the three-point hitch of a tractor in which the blades are each mounted on a mounting structure that is rigidly connected to end plates slidably and guidably connected to the side frame members with manually operated cam means adjusting the mounting members vertically to position the blades in optimum vertical relationship and to compensate for wear to maintain the blades in optimum position in relation to the slide shoes on the side frame members.

Still another object of the invention is to provide a grader in accordance with the preceding objects in which the mounting member for the grader blades is provided with vertically spaced apertures to enable the grader blades to be positioned in different relationships to the mounting member to compensate for wear thereby enabling the grader blade to be adjusted and positioned to compensate for wear of the working edge of the blade.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
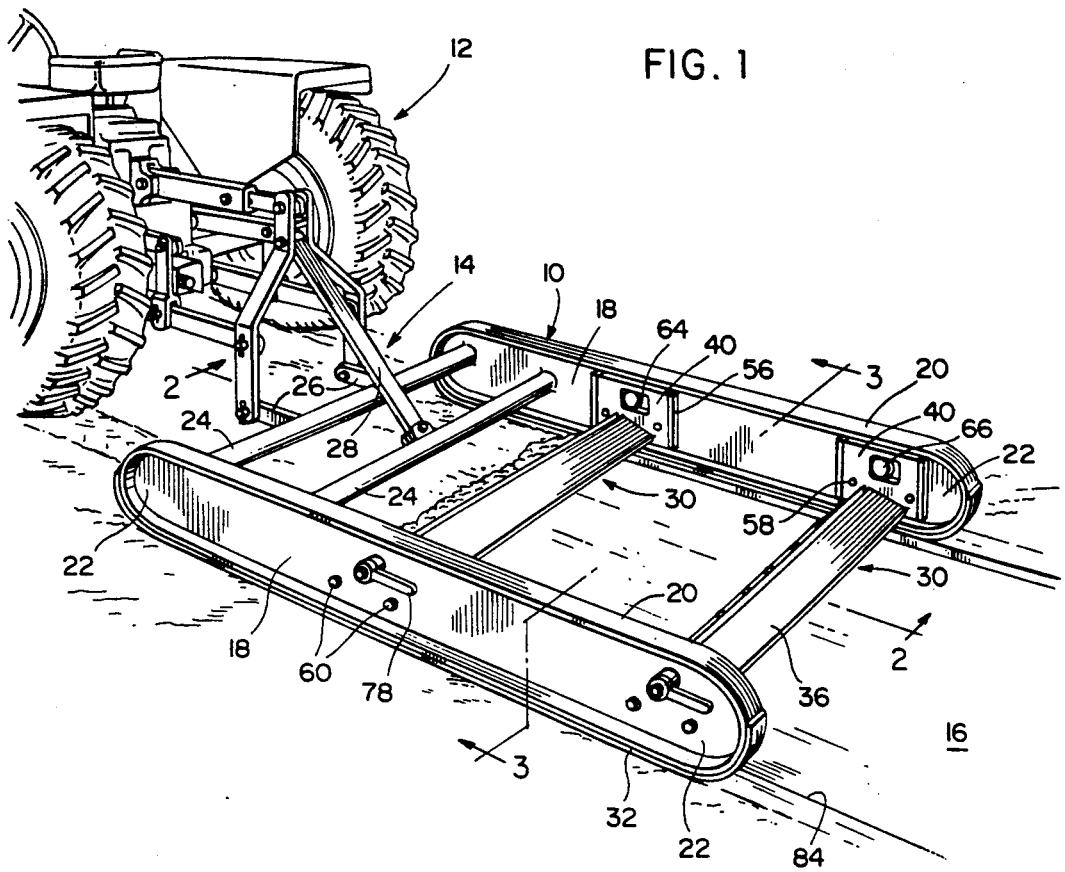
FIG. 1 is a perspective view of the grader of the present invention illustrating its association with a three-point hitch of a tractor.

Referring now specifically to the drawings, FIG. 1 illustrates the grader of the present invention generally designated by reference numeral 10 in association with a conventional tractor 12 having a three-point hitch structure generally designated by reference 14 by which the grader is supported, towed and lifted. It is pointed out that various types of tractors and similar towing vehicles may be utilized in association with the grader in order to pull or tow the grader at desired selected speeds and to be able to lift the grader off of the surface bed 16 when used in moving material The grader 10 includes a pair of side frame members 18 having a peripheral flange 20 with the side frame members 18 being elongated and provided with semicircular ends 22. The side frame members 18 are rigidly interconnected by a plurality of cross frames 24 to provide a rigid structure. The three-point hitch 14 is connected to the front cross frame 24 by brackets 26 which project forwardly or upwardly therefrom and a upper link 28 of the three-point hitch 14 is connected to a rearwardly spaced cross frame 24 for operation in the conventional manner of a three-point hitch in raising and lowering the grader.

Positioned between the side frame members and rigidly but adjustably mounted therebetween is a pair of grader blade assemblies 30 which are of identical construction. One of the grader blade assemblies will be described in detail together with the connection between the grader blade assembly 30 and the side frame members 18 each of which includes a slide shoe 32 attached to and forming a continuation of the lower surface of the bottom flange on the side frame members 18.

Figure 2:
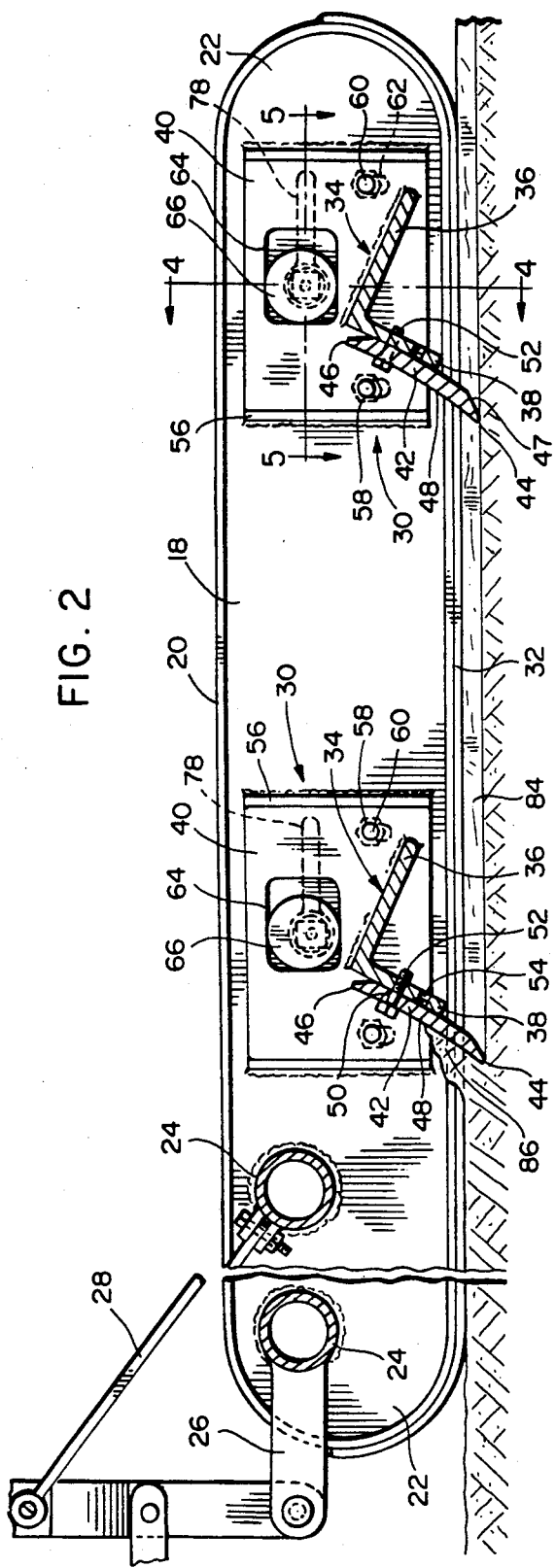
FIG. 2 is a longitudinal, sectional view of the grader.
Figure 3:
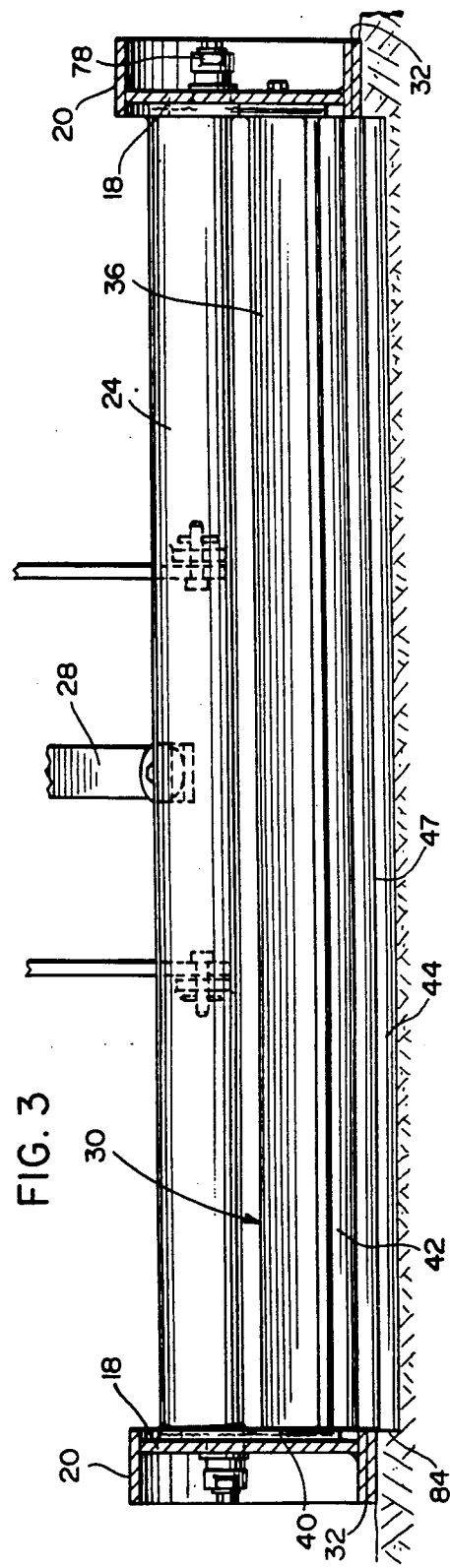
FIG. 3 is a transverse, sectional view of the grader.

Each grader blade assembly 30 includes an angled mounting member generally designated by reference numeral 34 which includes flanges 36 and 38 in perpendicular relation to each other and in rigid relation to each other with the mounting member 34 being of one piece, rigid construction and extending completely across the width of the grader. The ends of the flanges 36 and 38 are rigidly secured to a vertically disposed end plate 40 at each end of the mounting member 34 with the connection between the mounting member 34 and the end plates 40 being rigid welded construction to form a rigid unit. The end plates 40 are generally parallel to each other and the mounting member 34 is perpendicular to the end plates 40. The flange 36 is inclined upwardly and forwardly from its rearward lower edge and the flange 38 is shorter in width than the flange 36 and is inclined downwardly and forwardly from its rearward upper edge where it joins with the forward upper edge of flange 36 to form an upwardly facing apex between the flanges 36 and 38 as illustrated in FIG. 2.

Mounted on the forwardly facing flange 38 of the mounting member 34 is a grader blade 42 having a bottom cutting edge 44 and a top cutting edge 46 formed by rearwardly facing inclined or beveled surfaces 47. The blade 42 includes a forward surface 48 which is slightly concave and the rearward face may be slightly convex although it is generally flat where it engages the flange 38. The blade 42 includes an aperture 50 receiving a bolt 52 which threads into an internally threaded aperture 54 in the flange 38. As illustrated, two threaded apertures 54 are provided to enable the bolt 52 to be inserted into either aperture to compensate for wear of the grader blade 42 by enabling the lowermost cutting edge thereof to be moved downwardly in relation to the slide shoe 38 and mounting member 34 while maintaining the same angle of the blade 42. While the apertures 54 are disclosed as being threaded, they can be smooth apertures to receive a nut and bolt arrangement. Also, the head of the bolt can be countersunk into the front surface of the grader blade 42 to reduce drag caused by material being moved or graded engaging the bolt head. The grader blade 42 may also be made symmetrical with two rows of apertures to enable the blade to be reversed end-to-end so that either of the edges 44 and 46 may be positioned below the slide shoe 32.

The end plates 40 are positioned against the inner surface of the side frame members 18 and are guided in their vertical movement by a pair of spaced, parallel, vertical keys or ribs 56 which are welded to the inner surface of the side frame members 18 to guide the end plates during their vertical movement. Each end plate 40 is provided with a pair of apertures 58 which receive bolts 60 slidably received in mounting slots 62 formed in the side frame member 18 with the bolts 60 rigidly securing the end plates in adjusted position and further serving as guides and limits for vertical movement of the end plates 40.

Figure 4:
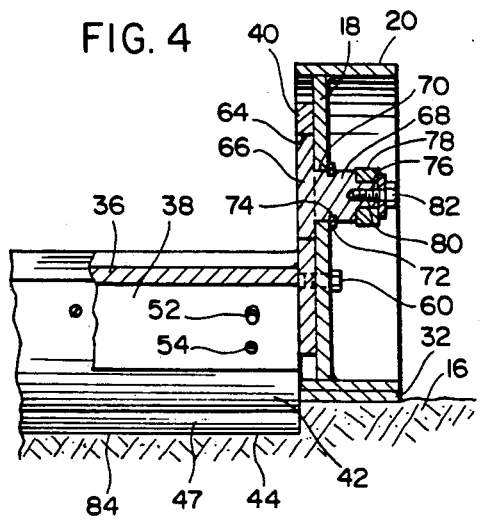
FIG. 4 is a detailed sectional view taken substantially upon a plane passing along section line 4—4 on FIG. 2 illustrating the specific structural details of the side frame members and the supporting end plate for the blades.
Figure 5:
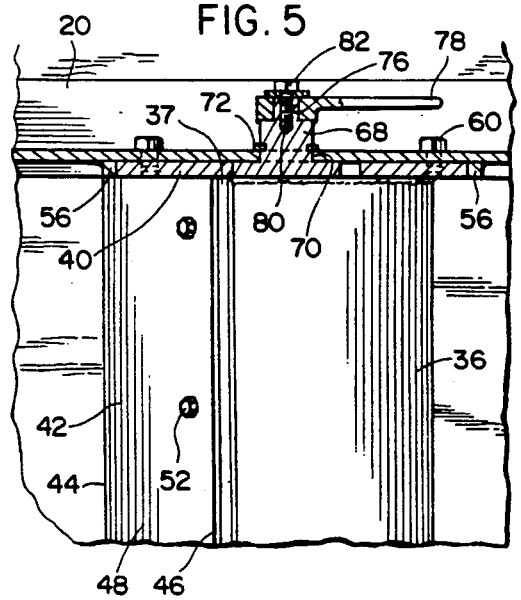
FIG. 5 is a plan sectional view taken substantially a plane passing along section line 5—5 on FIG. 2 illustrating further structural details of the side frame members and the end plates on the mounting member for the blades.

Each end plate 40 is provided with a cam follower in the form of an opening 64 of rectangular configuration and closely receiving a circular, eccentrically mounted cam member 66 with the height of the opening 64 corresponding with the diameter of the cam 66. The cam 66 is mounted eccentrically on a shaft 68 which is journaled in an aperture 70 in the side frame member with a split ring 72 received in a groove 74 in the shaft 68 retaining the shaft 68 mounted rotatably in the opening 70 with the cam 66 engaging one surface of the side frame member 18 and the retaining ring 72 engaging the outer surface thereof as illustrated in FIG. 4. The outer end of the cam shaft 68 is provided with a square end 76 over which a handle 78 is placed with the end of the square end 76 provided with an internally threaded bore 80 receiving a retaining bolt 82 which secures the handle 78 in place. Thus, when the bolts 60 are loosened and the handle 78 rotated, the mounting member 34 and the blade 42 are vertically adjusted with the vertical movement being guided and controlled by the keys 56 and the slots 62.

The cutting blade 42 is suitable to cut dirt and gravel surfaces in a surface bed 16 with the depth of penetration of the cutting blade 42 below the slide shoe determining the depth of cut as indicated by reference numeral 84 in FIG. 2 with the material removed being positioned forwardly of the cutting blade 42 as indicated by reference numeral 86. The two rows of apertures 54 in the flange 38 of the angled mounting member 34 permits the blade 42 to be mounted lower after extensive wear thereby compensating for the wear. The end plates 40 are secured to the plate forming the side frame member 18 by the bolts 60 with these bolts enabling the end plates 40 to be vertically moved by using the handle 78 rigidly attached to the cam shaft 68. The vertical movement of the end plates 40 and thus the mounting member 34 and the cutting blade 42 and the choice of mounting positions of the blade 42 on the angled mounting member 34 prolongs the life of the blade approximately three times that of a conventional fixed blade configuration. In use, the blade will be used until the lower edge becomes flush with the bottom surface of the skid shoe 32. The blade can then be lowered in ⅛" increments for a total of ⅝" which is the distance the slots 62 permit the end plates 40 to move. After the blade has been lowered its maximum amount by use of the cams, bolts and slots and it is used until the lower surface becomes flush with the skid shoe, the cams can be used to raise the blade assembly 30 and the blade 42 then can be remounted with the bolts 52 engaging the lower row of holes 54 in the flange 3 with the blade again being used until flush with the skid shoe and the incrementally lowered as indicated above.

As indicated previously, the angle of the blades is set at 17° in relation to vertical with this angle providing optimum results when used as a grader or when used for moving material from one point to another. When used as a grader, the angle of the blade provides an optimum cut into the surface bed 16 while creating a "boiling" effect to the material which moves in a rotatable motion due to the angle of the blades with this motion mixing and distributing the material back to the surface bed with fine material in the mix being released first to form a base and the larger material then being released to form the top layer which is an ideal mix for compaction. When the device is used to move material, the speed of the tractor is slowed down and because of the angle of the blades, the material can be pulled and distributed with the "boiling" effect causing the material to mix but instead of it being released, the material rolls in front of the blades until released by the tractor operator raising the grader above the bed surface 16.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A grader comprising a rigid frame defined by a pair of parallel ground engaging side frame members rigidly interconnected by transverse frame means, a pair of longitudinally spaced, transversely extending parallel blade assemblies, means connecting said blade assemblies to said side frame members, each of said blade assemblies including a continuous cutting blade oriented at an angle of 17° in relation to vertical, said means connecting the blade assemblies to the side frame members including an end plate rigidly connected to each end of each blade assembly and oriented vertically for engagement with the side frame members, each side frame member including a pair of vertical guides engaging and guiding each of said end plates, said means connecting the blade assemblies to the side frame members further including cam means interconnecting the end plates and side frame members to move the end plates vertically and means interconnecting the end plates and side frame members to lock the end plates in a vertically adjusted position to provide a rigid support for the blade assemblies.

2. The structure as defined in claim 1 wherein each blade assembly includes an angled mounting member extending between and rigidly affixed to said end plates, said mounting member including an angled flange, said continuous cutting blade mounted on said angled flange with a cutting edge on the blade being disposed below the side frame members.

3. The structure as defined in claim 2 wherein each of said side frame members includes a slide shoe along the bottom surface thereof with the cutting edge of each blade being positioned below the slide shoe for cutting engagement with a surface bed.

4. The structure as defined in claim 3 wherein said angled flange includes a pair of rows of mounting holes for supporting the cutting blade, bolt means extending through the cutting blade and through a selective row of holes on the angled flange to adjustably orient the cutting edge of the blade below the slide shoe.

5. The structure as defined in claim 4 wherein said means to lock the end plates in a vertically adjusted position includes a pair of slots in each side frame member, said end plate receiving a pair of bolts extending through the slots to lock the end plates in a vertically adjusted position in relation to the side frame members.

6. The structure as defined in claim 5 wherein said cam means includes a follower opening formed in each end plate, a circular cam member positioned in said opening with the vertical height of the opening being substantially equal to the diameter of the cam member, a cam shaft rigidly affixed to said cam member in eccentric relation to its center with the cam member extending rotatably through an aperture in the side frame member and being retained therein to move the end plate in relation to the side frame member when the cam shaft is rotated.

7. The structure as defined in claim 6 wherein said cam shaft is provided with a polygonal end outwardly of the side frame member, a handle rigidly affixed to the polygonal end of the cam shaft and being secured thereto by a retaining means.

8. A grader including a pair of rigidly interconnected side frame members adapted to be towed and supported by a three-point hitch on a tractor, at least one transversely extending blade assembly interconnecting and extending between said frame members, said blade assembly including a mounting member having a transversely continuous blade mounted thereon, means supporting said mounting member from the side frame members to enable vertical movement of the blade, said means including a vertical end plate on each end of the mounting member, means on the side frame members to guide vertical movement of the end plates, bolt and slot means for limiting movement of the end plates and locking the end plates in position and cam means interconnecting said end plates and side frame members to vertically adjust the end plates in relation to the side frame members.

9. A grader comprising a rigid frame defined by a pair of parallel ground engaging side frame members rigidly interconnected by transverse frame means, a pair of longitudinally spaced, transversely extending parallel blade assemblies, means vertically adjustably connecting each of said blade assemblies to said side frame members, each of said blade assemblies including a continuous cutting blade angled rearwardly and upwardly in relation to said side frame members, said means vertically adjustably connecting each of said blade assemblies to said side frame membersmaintaining a constant angular relation between each of said blades and said side frame members during vertical adjustment, said means connecting the blade assemblies to the side frame members includes an end plate rigidly connected to each end of each blade assembly and oriented vertically for engagement with the side frame members, each side frame member including a pair of vertical guides engaging and guiding each of said end plates, said means vertically adjustably connecting the blade assemblies to the side frame members further including means interconnecting the end plates and side frame members to move the end plates vertically and means interconnecting the end plates and side frame members to lock the end plates in a vertically adjusted position to provide a rigid support for the blade assemblies.

10. The grader as defined in claim 9 wherein each blade assembly includes an angled mounting member extending between and rigidly affixed to said end plates, said mounting member including an angled flange, said continuous cutting blade mounted on said angled flange with a cutting edge on the blade being disposed below the side frame member.

11. The grader as defined in claim 9 wherein each of said side frame members includes a slide show along the bottom surface thereof with a cutting edge of each blade being positioned below the slide shoe for cutting engagement with a surface bed.

12. The grader as defined in claim 9 wherein said angled flange includes a pair of row of mounting holes for supporting the cutting blade, bolt means extending through the cutting blade and through a selective row of holes on the angled flange to adjustably orient the cutting edge of the blade below the slide shoe.

13. The grader as defined in claim 9 wherein said means to lock the end plates includes a pair of slots in each side from a member, a pair of bolts extending through the end plates and slots to selectively lock the end plates in a vertically adjusted position in relation to the side frame members.

14. The grader as defined in claim 9 wherein said means to move the end plates vertically includes a follower opening formed in each end plate, a circular cam member positioned in said opening with the vertical height of the opening being substantially equal to the diameter of the cam, a cam shaft rigidly affixed to said cam member in eccentric relation to it center with the cam member extending rotatably through an aperture in the side frame member and being retained therein to move the end plate in relation to the side frame member when the cam shaft is rotated, said cam shaft being provided with an end outwardly of the side frame member, a handle rigidly affixed to the end of the cam shaft outwardly of the side frame member to rotate the cam shaft for vertically adjusting said end pates and cutting blade.

15. The grader as defined in claim 9 wherein each of said cutting blades is oriented at a 17° angled to vertical with this angle being maintained during vertical adjustment.

16. The grader as defined in claim 12 wherein each of said cutting blades is oriented at a 17° angle to vertical with this angle being maintained during vertical adjustment.

* * * * *